(12) United States Patent
Xiang

(10) Patent No.: US 12,100,056 B2
(45) Date of Patent: Sep. 24, 2024

(54) COMPUTER-IMPLEMENTED METHODS, COMPUTER-READABLE MEDIA, AND SYSTEMS FOR IDENTIFYING CAUSES OF LOSS

(71) Applicant: Munich Reinsurance America, Inc., Princeton, NJ (US)

(72) Inventor: Yuxiang Xiang, Plainsboro, NJ (US)

(73) Assignee: Munich Reinsurance America, Inc., Princeton, NJ (US)

( * ) Notice: Subject to any disclaimer, the term of this patent is extended or adjusted under 35 U.S.C. 154(b) by 0 days.

(21) Appl. No.: 18/472,538

(22) Filed: Sep. 22, 2023

(65) Prior Publication Data

US 2024/0013315 A1 Jan. 11, 2024

Related U.S. Application Data

(63) Continuation of application No. 16/229,261, filed on Dec. 21, 2018, now abandoned.

(60) Provisional application No. 62/631,579, filed on Feb. 16, 2018.

(51) Int. Cl.
  *G06Q 40/08*  (2012.01)
  *G06F 16/33*  (2019.01)
  *G06F 40/20*  (2020.01)
  *G06Q 50/18*  (2012.01)

(52) U.S. Cl.
  CPC ......... *G06Q 40/08* (2013.01); *G06F 16/3347* (2019.01); *G06F 40/20* (2020.01); *G06Q 50/18* (2013.01)

(58) Field of Classification Search
  CPC .............................. G06Q 40/08; G06Q 50/18
  See application file for complete search history.

(56) References Cited

U.S. PATENT DOCUMENTS

| | | | |
|---|---|---|---|
| 8,643,648 B2 | 2/2014 | Heywood et al. | |
| 2003/0069877 A1 | 4/2003 | Grefenstette et al. | |
| 2007/0282824 A1 | 12/2007 | Ellingsworth | |
| 2008/0059187 A1 | 3/2008 | Roitblat et al. | |
| 2008/0195577 A1 | 8/2008 | Fan et al. | |
| 2008/0270268 A1 | 10/2008 | Pacha et al. | |
| 2010/0082333 A1 | 4/2010 | Al-Shammari | |
| 2010/0191731 A1 | 7/2010 | Rus et al. | |
| 2011/0055206 A1 * | 3/2011 | Martin | G06F 40/289 707/723 |
| 2011/0255782 A1 | 10/2011 | Welling et al. | |

(Continued)

OTHER PUBLICATIONS

"Communication, Extended European Search Report, European Patent Application No. 18906514.7", Oct. 20, 2021, 11 pages.

(Continued)

*Primary Examiner* — Scott C Anderson
(74) *Attorney, Agent, or Firm* — Saul Ewing LLP; Brian R. Landry

(57) ABSTRACT

Another aspect of the invention provides a system for identifying causes of loss from insurance claims data comprising a plurality of unstructured or semi-structured insurance claims data. The system includes: a processor; and computer-readable memory containing instructions to: implement an interface programmed to receive insurance claims data comprising one or more insurance claims; store the insurance claims data in the computer-readable memory; and invoke execution of the method as described herein on the processor.

1 Claim, 4 Drawing Sheets

(56) References Cited

U.S. PATENT DOCUMENTS

| | | |
|---|---|---|
| 2013/0054603 A1 | 2/2013 | Birdwell et al. |
| 2013/0060584 A1 | 3/2013 | Balthazar et al. |
| 2014/0330594 A1 | 11/2014 | Roberts et al. |
| 2016/0103823 A1 | 4/2016 | Jackson et al. |
| 2016/0140643 A1 | 5/2016 | Nice et al. |
| 2016/0232630 A1 | 8/2016 | Admon |
| 2016/0357934 A1 | 12/2016 | Dong et al. |
| 2017/0017721 A1 | 1/2017 | Sauper et al. |
| 2017/0111506 A1 | 4/2017 | Strong et al. |
| 2017/0147682 A1 | 5/2017 | Alaqeeli et al. |
| 2018/0011976 A1* | 1/2018 | Lewis .................... G16H 40/63 |
| 2018/0129944 A1 | 5/2018 | Meunier et al. |
| 2018/0336183 A1* | 11/2018 | Lee ........................ G06N 5/022 |
| 2019/0163817 A1 | 5/2019 | Milenova et al. |

OTHER PUBLICATIONS

"International Search Report and Written Opinion, International Patent Application No. PCT/US2018/067056", Apr. 9, 2019.

Wikipedia, "F1 Score", https://en.wikipedia.org/wiki/F1-score, downloaded Jan. 11, 2018, 3 pages.

Wikipedia, "n-gram", https://en.wikipedia.org/wiki/N-gram, downloaded Jan. 11, 2019, 8 apges.

Wikipedia, "Unstructured data", https://en.wikipedia.org/wiki/Unstructured_data, downloaded Jan. 2, 2018, 4 pages.

Atapattu, T., et al., "Automated Extraction of Semantic Concepts from Semi-structured Data: Supporting Computer-Based Education through the Analysis of Lecture Notes", DEXA 2012, Part I, LNCS 7446, 2012, 161-175.

Communication pursuant to Article 94(3) EPC, European Patent Application No. 18906514.7, Jun. 11, 2024.

* cited by examiner

COMPUTER-IMPLEMENTED METHODS, COMPUTER-READABLE MEDIA, AND SYSTEMS FOR IDENTIFYING CAUSES OF LOSS

CROSS-REFERENCE TO RELATED APPLICATIONS

This application is a continuation under 35 U.S.C. § 120 of U.S. patent application Ser. No. 16/229,261, filed Dec. 21, 2018, which claims the benefit of priority under 35 U.S.C. § 119(e) to U.S. Provisional Patent Application Ser. No. 62/631,579, filed Feb. 16, 2018. The entire content of each of these applications is hereby incorporated by reference herein.

FIELD OF THE INVENTION

The present invention relates generally to computer-implemented methods, computer-readable media, and systems for identifying causes of loss from unstructured or semi-structured insurance claims data.

BACKGROUND OF THE INVENTION

Insurers and re-insurers seek a better understanding of accidents in order to lower the incidence of accidents. At least in the auto insurance field, most claims include a text description generated by a human (e.g., a claims representative, a policyholder, a police officer, and the like). These descriptions pose an obstacle to understanding the underlying causes of accidents across the large (e.g., thousands of claims per year) data sets generated by insurance companies.

SUMMARY OF THE INVENTION

One aspect of the invention provides a computer-implemented method of identifying causes of loss from insurance claims data including a plurality of unstructured or semi-structured insurance claims. The computer-implemented method includes: loading insurance claims data including a plurality of unstructured or semi-structured insurance claims into memory on a computer; for each of at least a subset of the insurance claims within the insurance claims data, creating a corresponding pre-processed claim record by: tokenizing the insurance claims loaded into memory to separate words in the insurance claims loaded into memory from punctuation, lemmatizing the words in the insurance claims loaded into memory to map morphological variations onto a common base word, removing stop words from the insurance claims loaded into memory, removing punctuation and numbers from the insurance claims loaded into memory, and replacing abbreviations and common typographical errors with associated words previously-defined in a data dictionary stored in memory; creating a Term Frequency-Inverse Document Frequency (TF-IDF) matrix in memory detailing relative frequency of a plurality of n-word terms within at least a subject of the pre-processed claim record, wherein n is a positive integer; selecting a plurality of features from the TF-IDF matrix; and creating a binary classifier for each of a plurality of causes of loss.

This aspect of the invention can include a variety of embodiments. For example, n can be an integer between 1 and 6. The selecting step can include applying a chi-squared test for each of the plurality of features within the TF-IDF matrix.

The computer-implemented method can further include applying the binary classifiers against a plurality of the pre-processed claim records not previously used in creating the binary classifiers to identify one or more causes of loss. The computer-implemented method can further include, if one or more of the insurance claims was not classified by any of the binary classifiers, designating the insurance claim as unclassifiable. The computer-implemented method can further include selecting a single cause of loss from the one or more causes of loss identified by the binary classifiers based upon a pre-defined hierarchy. The binary classifiers can be applied in a previously specified priority order. The binary classifiers can be applied to identify a single cause of loss.

The computer-implemented method can further include identifying whether a plurality of the insurance claims was preventable, non-preventable, or partially preventable based on previously stored associations between causes of loss and prevention techniques. The computer-implemented method can further include identifying one or more prevention techniques for a plurality of the insurance claims identified as preventable or partially preventable based on previously stored associations between causes of loss and prevention techniques. The computer-implemented method can further include identifying which of the one or more prevention techniques are associated with a highest aggregate or average loss over the plurality of preventable or partially preventable insurance claims.

The computer-implemented method can further include discarding terms having a total frequency over the plurality of insurance claims of less than or equal to 2 before either creating the TF-IDF matrix or selecting a plurality of features from the TF-IDF matrix.

Another aspect of the invention provides a computer-implemented method of identifying causes of loss from insurance claims data comprising a plurality of unstructured or semi-structured insurance claims. The computer-implemented method includes: loading insurance claims data comprising a plurality of unstructured or semi-structured insurance claims into memory on a computer; for each of at least a subset of the insurance claims within the insurance claims data, creating a corresponding pre-processed claim record by: tokenizing the insurance claims loaded into memory to separate words in the insurance claims loaded into memory from punctuation, lemmatizing the words in the insurance claims loaded into memory to map morphological variations onto a common base word, removing stop words from the insurance claims loaded into memory, removing punctuation and numbers from the insurance claims loaded into memory, and replacing abbreviations and common typographical errors with associated words previously-defined in a data dictionary stored in memory; applying the binary classifiers created using the methods described herein against a plurality of the pre-processed claim records to identify one or more causes of loss for each of the insurance claims within the insurance claims data.

This aspect of the invention can have a variety of embodiments. The computer-implemented method can further include, if one or more of the insurance claims was not classified by any of the binary classifiers, designating the insurance claim as unclassifiable. The computer-implemented method can further include selecting a single cause of loss from the one or more causes of loss identified by the binary classifiers based upon a pre-defined hierarchy.

Another aspect of the invention provides a system for identifying causes of loss from insurance claims data comprising a plurality of unstructured or semi-structured insurance claims data. The system includes: a processor; and computer-readable memory containing instructions to: implement an interface programmed to receive insurance claims data comprising one or more insurance claims; store the insurance claims data in the computer-readable memory; and invoke execution of the method as described herein on the processor.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1A:
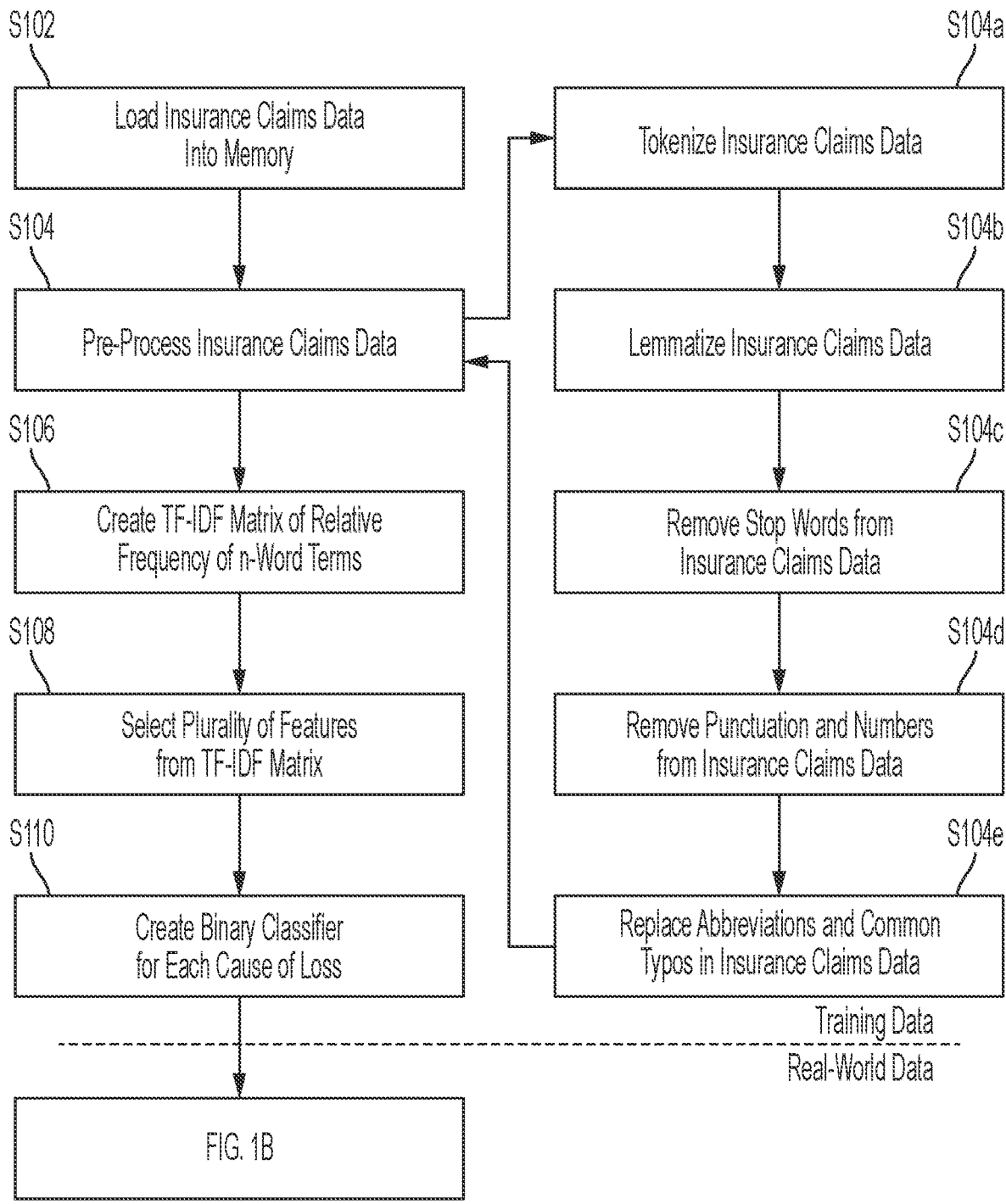
FIG. 1A depicts a method for building a plurality of binary classifiers to identify causes of loss for textual data according to an embodiment of the invention.

The instant invention is most clearly understood with reference to the following definitions.

As used herein, the singular form "a," "an," and "the" include plural references unless the context clearly dictates otherwise.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

As used herein, "insurance claims data" represents the data for which a loss analysis is requested regardless of whether or not it was received from insurance companies, their system processors, their agents, insurance clients and/or their brokers, individual fleets or loss mitigation product vendors.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

As used herein, the term "unstructured data" includes information that either does not have a pre-defined data model or whose textual components are not organized in a pre-defined manner. As used herein, the term "semi-structured data" includes unstructured data within a data model or other pre-defined manner. For example, insurance claims data may be in a data model in which certain fields (e.g., date of accident, driver, automobile make and/or model, rental status) are well-defined, but other data (e.g., accident description) accept free-form text.

DETAILED DESCRIPTION

Embodiments of the invention provide computer-implemented methods, computer-readable media, and systems for identifying causes of loss from textual data. Although described in the context of automotive insurance claims, it could be applied to other insurance lines, e.g., casualty insurance, health insurance, disability insurance, life insurance, property insurance, aviation insurance, boiler insurance, builder's risk insurance, crop insurance, home insurance, landlord insurance, marine insurance, liability insurance, and the like.

Although textual data poses processing challenges, it provides a valuable narrative to human readers that process an insurance claim and captures information that could not be efficiently captured in structured fields that must be programmed in advance and become tedious if too numerous.

Further complicating claims classification across various entities is the nonstandard codification process and data capture methodologies employed by each collecting company. The ability to bypass these differences by analyzing the original sources of the data provides a unique opportunity to gain insight from hundreds of thousands to millions of analyzed records, rather than the just the thousands produced by one company.

However, if one could discover valuable insight from this textual information, a company could have a better understanding of why the accidents occurred, whether they were preventable, and how. The invention described enables this deeper and automated insight.

Embodiments of the invention are particularly useful for re-insurers that may seek to better understand their underwriting risks and associated loss mitigation potential and/or share this data with their insurance company clients. In particular, even if each individual insurance company client used internally consistent styles for describing accidents—a highly unlikely condition—it is also highly unlikely that such styles would be identical across insurance companies or the agencies they contract with to process their losses. For example, inconsistencies can arise from at least three sources. First, different people will often use different language for a similar story. Such variations can exist on an individual, generational, and/or regional level. Additionally, the report authors may have access to differing amounts of information and may perceive different information to be relevant or irrelevant. Moreover, some companies have their unique loss codes or cause-of-loss buckets.

Product manufacturers or individual fleets (e.g., rental car fleets, government vehicles, and the like) can process their loss descriptions outside of the insurance context for similar analysis to determine what type of loss mitigation method might be the most economically feasible for their unique loss situation. While the accident/incident description provided may not be in the context of insurance, the invention's analysis process would be applicable.

The incident/accident data can be unstructured or semi-structured. For example, the insurance claims data can include human-generated descriptions of claims, examples of which are provided in Table 1 below. Although embodiments of the invention are particularly useful in processing unstructured data, structured data associated with an insurance claim can also be utilized. For example, structured data fields detailing the time of accident, age of driver, vehicle type, vehicle usage, and the like can also be utilized to identify features for use in building binary classifiers.

TABLE 1

Example Loss Descriptions

INSURED JUST DISCOVERED THAT THE CATALYTIC CONVERTER HAS BEEN STOLEN
CATALYTIC CONVERTER HAS BEEN STOLEN OFF THE VEHICLE
INSURED ACTIVATED OUTRIGGING ON IV .APPARATUS STRUCK& DAMAGED[ . . . ]
IV WAS PARKED UNKNOWN PARTY HIT FRONT END
WINDSHIELD CRACKED BY ROCK THAT GOT KICKED UP
INSURED VEHICLE SKIDDED WHILE PLOWING TOWN PARK VEHICLE HIT RAIL
IV WENT TO RETRIEVE A PERSONAL ITEM FROM THE SUNGLASS HOLDER, [ . . . ]
JOHN SMITH WAS TRAVELLING DOWN SULLIVAN AVENUE IN SOUTH [ . . . ]
IV STRUCK CV IN THE REAR

Figure 1B:
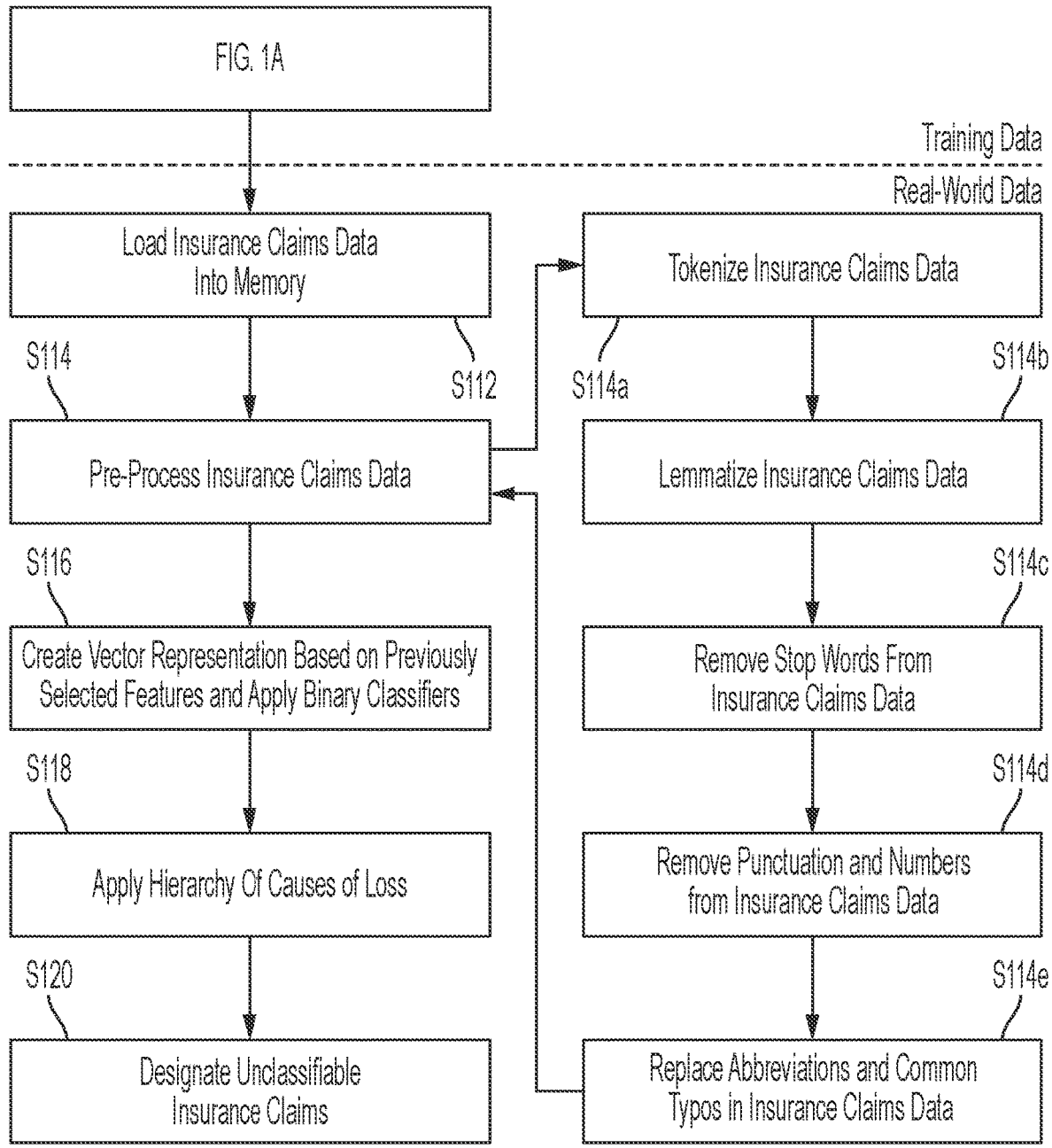
FIG. 1B depicts a method for identifying causes of loss for textual data according to an embodiment of the invention.

Referring now to FIGS. 1A and 1B, one embodiment of the invention provides a computer-implemented method for identifying causes of loss from insurance data. Although the method described in FIGS. 1A and 1B can be practiced in a single instance, it need not and, in many instances, will not be practiced in a single instance. Instead, the method of FIG. 1A will often be performed once using a training data set in which a cause of loss was previously specified (e.g., by humans) to build classifiers before the method of FIG. 1B is applied to client-provisioned data. The training method of FIG. 1A can be repeated for each data set (e.g., each time an insurance client provides data for analysis), periodically (e.g., every week, month, year, and the like), upon introduction of new causes of loss (e.g., for accidents deemed unclassifiable), and the like.

In step S102, insurance claims data is loaded into memory. The insurance data can be transferred from various media including storage disks using various technologies. For example, the insurance claims data can be submitted over the internet in a variety of file types.

In step S104, the insurance claims can be preprocessed before it is mapped onto a meaningful computation representation, such as a vectorial representation, used in later steps of the methods. Preprocessing maps claims onto a list of tokens that have linguistic meaning, e.g., n-word terms, that can then be classified in further steps. Preprocessing can include one or more of the following steps: tokenization (S104a), lemmatization (S104b), stop word removal (S104c), punctuation and number removal (S104d), and replacement of abbreviations and common typographical errors (colloquially, "typos") (S104e).

Tokenization (S104a) separates punctuation from words.

Referring to step S104b, lemmatization maps each morphological variation of a word to its base form. For example, the words, "go", "going", "went", and "gone" are lemmatized to their root or base form "go". Lemmatizers include the WORDNET® system, available from Princeton University of Princeton, New Jersey. Other lemmatizers can be used, including the MORPHA™ software described in G. Minnen et al., Applied morphological processing of English, 7(3) *Natural Language Engineering* 207-23 (2001) and available at http://www.informatics.susx.ac.uk/research/groups/nlp/carroll/morph.html.

Referring to step S104c, "stop words" (also called "stopwords" or "noise words") are common words that appear in too many documents and, therefore, do not have discriminative power. That is, stop words cannot be used to capture the essence of a document such that one can differentiate one document from another. Standard lists of stop words are provided in software programs such as the SMART Information Retrieval System, available from Cornell University of Ithaca, N.Y. The SMART stop word list is available at ftp://ftp.cs.cornell.edu/pub/smart/english.stop. A collection of stop words for a particular set of documents can be manually selected using domain knowledge or created by selecting the words that occur in more than 80% of the documents. See R. Baeza-Yates & B. Ribeiro-Neto, *Modern Information Retrieval* § 7.2 (1999). For example, "PR" (an abbreviation for "police report") may be a stop word in an automotive accident data set.

Removal of numbers in step S104d can reduce overfitting in later steps caused by inherent ambiguity in numbers. (For example, the number "75" could represent a vehicle speed, a compass bearing, a street address number, a route number, a vehicle make year, and the like.)

Step S104e can use a custom dictionary reflecting domain knowledge (e.g., of the automotive insurance industry, of a particular insurance client, and the like). For example, in "id strikk cv", "id" should be "IV" ("insured vehicle") and "strikk" should be "struck", indicating that an insured vehicle struck claimant vehicle. Additionally or alternatively, the model can adjust for regional phraseology such as determining that "driver ran the light" has the same meaning the same as "driver did not stop for light".

As a result of step S104, a variety of free-form text descriptions may converge to a common format. For example, a description of "IV Rearend-ed CV" (along with variations thereof) can be cleaned to "Insur vehicl rear end claimant vehicl" (or other descriptions based on the custom dictionary).

In step S106, a Term Frequency-Inverse Document Frequency (TF-IDF) matrix is created in memory detailing relative frequency of a plurality of n-word terms within each insurance claim, wherein n is a positive integer. The consideration of n-word terms captures the potential significance of phrases such as the 2-word "stop light", which may connote a more specific meaning than the 1-word term "stop".

Insurance claims can be mapped onto a vectorial representation where each report is a |V| dimensional vector, where V is the vocabulary of a large collection of defect reports and |V| is the size of the vocabulary. The vocabulary can be obtained by extracting unique terms after preprocessing the collection. Each dimension in this space of |V| dimensions corresponds to a unique term in the collection and the value along the dimension is a weight that indicates the importance of the term/dimension for a particular report $d_j$. Below is an exemplary representation for insurance claim $d_j$:

$$d_j = [w_1, w_2, w_3, \ldots, w_{|V|}] \quad (1)$$

where $w_i$ is the weight of term i in document $d_j$. Usually, if a term is not present in a document $d_j$, the corresponding value in the vector for the term is zero. Although the TF-IDF approach is described herein, other weighting schemes can be used.

TF-IDF is a composed measure that is the product of the frequency of a term in a document (TF) and its inversed document frequency (IDF). TF-IDF provides a metric measuring the importance of term. A term will receive a high value if it frequently appears in the document (TF) and does not occur often in other documents (IDF).

The TF ("term frequency") value for term $t_i$ within document $d_j$ can be expressed mathematically as $TF_{i,j}=n_{i,j}$ or can be normalized using the equation $$TF_{i,j} = \frac{n_{i,j}}{\max_k n_{k,j}},$$

wherein $n_{i,j}$ is the number of occurrences of the considered term in document $d_j$ and the denominator is the frequency of the most frequent term in document $d_j$. The denominator is used to normalize the TF values. Other normalization factors can be used such as the most-frequent term in any document in the collection or the number of occurrences of all terms in document $d_j$.

The IDF of a term is the percentage of distinct documents the term appears in amongst a collection of documents. The IDF measures the specificity of a term. The fewer documents a term appears in, the more specific the term is. The IDF can be expressed mathematically as:

$$IDF_i = \log \frac{|D|}{|\{d_j : t_i \in d_j\}|} \quad (2)$$

wherein $|D|$ is the total number of documents in the corpus and $|\{d_j:t_i \in d_j\}|$ is the number of documents where the term $t_i$ appears (that is, $n_{i,j} \neq 0$). In another embodiment, $$IDF(t) = 1 + \log\left(\frac{N}{df(t)}\right),$$

wherein the logarithm function provides non-linear scaling, N represents the total number of reports in the collection, and df(t) represents the number of reports containing the term t.

Figure 4:
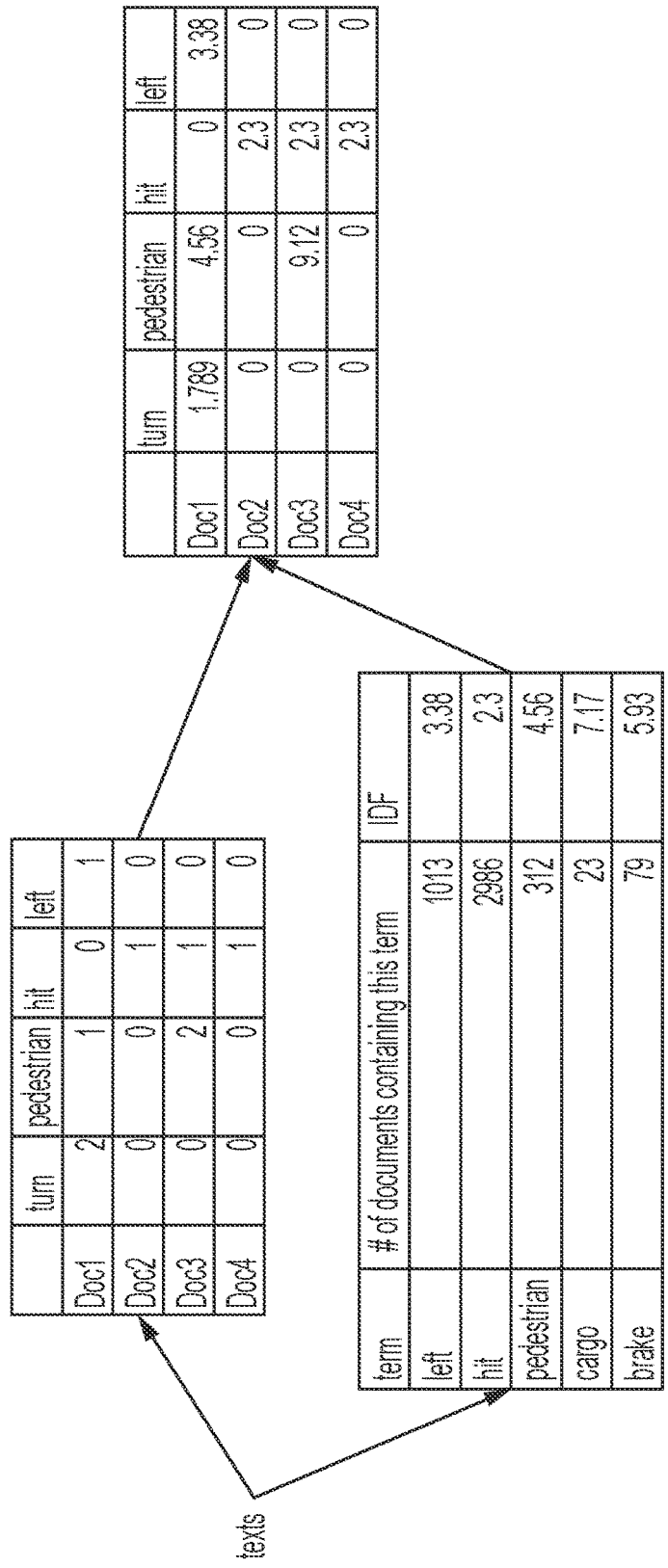
FIG. 4 depicts a method of generating a Term Frequency-Inverse Document Frequency (TF-IDF) matrix according to an embodiment of the invention.

An exemplary implementation of a TF-IDF matrix is depicted in FIG. 4.

In step S108, a plurality of features are selected from the TF-IDF matrix. For example, a chi-squared test can be used to identify a difference in expected frequency of a cause of loss in the training set relative to the observed frequency of the cause of loss when a feature is present. The m n-grams having the largest chi-squared value can be selected for further use.

In step S110, binary classifiers are created for each of a plurality of causes of loss. A binary classifier divides each of a set of insurance claims into two groups: YES or NO for each potential cause of loss.

TABLE 2

| Binary Classifications for "The insured vehicle made a left turn and hit a parked vehicle" | |
|---|---|
| Left turn? | YES |
| Hit pedestrian? | NO |
| Not at fault? | NO |
| ... | ... |
| Hit parked vehicle? | YES |

Multiple classifier algorithms could be used instead of binary classifier algorithms. However, binary classifier algorithms are preferred because accident data tends to be unbalanced across cause of loss. For example, 40% of all accidents may be rear-end collisions and 30% may involve a parked car, while other causes of loss may occur in less than 10% of insurance claims. Multiple classifiers would prefer these larger classification "buckets" and tend to classify an insurance claim as the most prevalent cause of loss, even though other rarer causes of loss may also be present. Binary classification identifies all causes of loss and allows for optional later culling to one or more causes of loss in step S120.

Various binary classifier algorithms can be used including the following listed in Table 3 using a 70%-30% training-testing data split.

TABLE 3

Performance Data for Various Binary Classifiers

| Binary Classifier | Overall Accuracy | Comments |
|---|---|---|
| Random Forest | 86% | |
| Stochastic gradient descent | 82% | |
| Support vector machine (non-linear RBF kernel) | 78% | Best performance on large buckets |
| Support vector machine (linear kernel) | 80% | Fastest |

Referring again to FIG. 1B, the binary classifiers built in the method of FIG. 1A can now be used to classify unseen insurance claims data. The initial loading and pre-processing steps S112 and S114 (including steps S114a-S114e) can be similar or identical to steps S102 and S104. In some embodiments, loading and pre-processing can be performed once. For example, insurance claims data can be received from an insurance client, loaded, pre-processed, and divided into training and real-world data sets in any order.

In step S116, each binary classifier built in step S110 can be applied against each insurance claim. This may produce a plurality of positive answers for a single insurance claim as seen in Table 2.

In step S118, a priority or hierarchy of causes of loss can be applied to identify and associate a single cause of loss with each insurance claim. For example, an IF-ELSE loop can be applied over each insurance claim in the order of priority to check if the claim was classified as cause of loss 1, 2, . . . , n. When the highest priority cause of loss is identified, that cause of loss can be associated with the insurance claim and the loop can terminate. In other embodiments, searches can be performed iteratively for each cause of loss in order of priority.

In some embodiments, the priority order is set based on the number of classifications made in step S118. For example, the priority order can be in order from most-to-least or least-to-most inclusive classifiers.

In still other embodiments, the binary classifiers can be applied in step S116 in order of priority (e.g., the highest priority classifier first), with further binary classifiers only applied to the sub-set of insurance claims not yet classified by a classifier for a higher priority cause of loss.

Some insurance claims may not yield a positive answer for any cause of loss and can be designated as "unclassifiable" in step S120. String matching and/or human review can be performed to identify one or more causes of loss and such data can be used for further training of the binary classifiers in S110.

Exemplary Deliverables

The classifications produced by the invention are valuable in and of themselves. The classifications can also be augmented to provide actionable advice to insurance and reinsurance companies. For example, the distribution of causes of loss produced by the methods described herein can be married with cost data from the insurance claims (e.g., by division) to identify which causes of loss are associated with the highest average cost per claim. Likewise, costs associated with the insurance claims or industry averages can be associated with the classifications (e.g., by multiplication) to identify which causes of loss result in the largest aggregate costs over a portfolio. Furthermore, the cause of loss distribution can be married with data regarding prevention techniques (e.g., forward collision warning device, driver training, rear backup camera, lane departure warning device, blind spot monitoring device, motorcycle warning device) and associated costs and risk reduction to identify the largest opportunities for cost savings. Additionally or alternatively, costs or risk exposure can be presented graphically (e.g., in bar or pie charts) or on numerical scale (e.g., exposure due to each cause of loss on a 0-10 scale).

Exemplary Implementation

Figure 2:
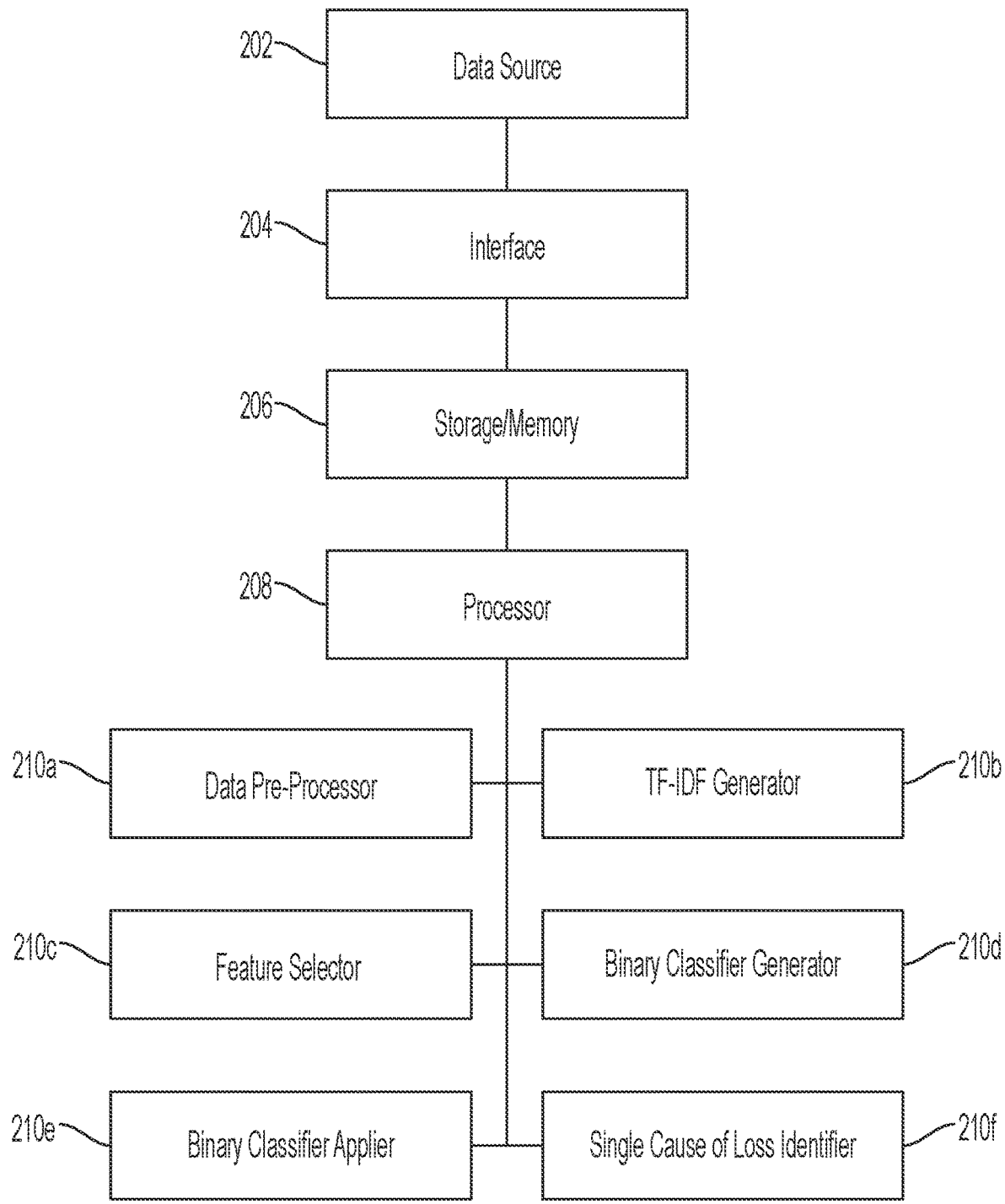
FIG. 2 depicts a computer system through which provisioned textual data can be interfaced, stored, and processed to identify causes of loss and/or mitigation techniques according to an embodiment of the invention.
Figure 3:
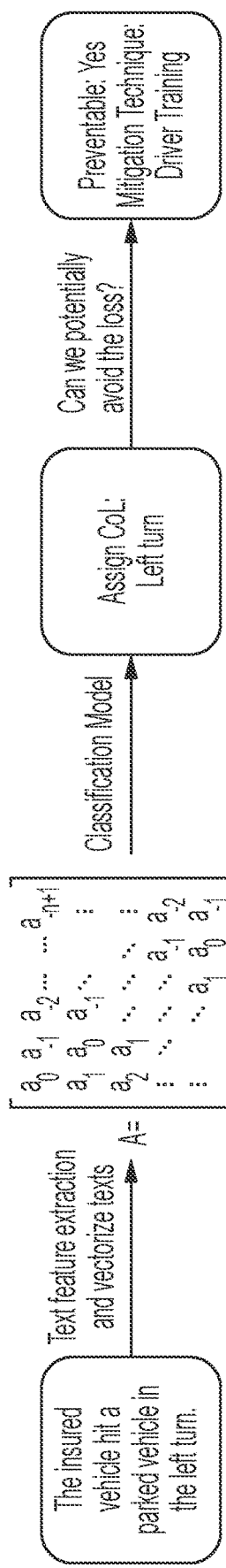
FIG. 3 depicts a system for identifying causes of loss and/or accompanying mitigation techniques for textual data according to an embodiment of the invention.

Referring now to FIG. 2, another embodiment of the invention provides a system 200 for implementing the methods described herein.

An interface 204 can support communication with a data source 202, which can be an internal or an external client. For example, interface 204 can be a Web page or other internet technology that allow customers to upload insurance claims data. The interface 204 can verify compliance with various input requirements. The interface 204 can also relay the information to storage/memory 206 and/or processor 208. For example, the interface 204 can invoke one or more processes for execution by the processor 208.

Processor 208 can load and execute one or more functions, methods, modules, objects or other computing structures to implement the methods described herein. For example, data pre-processing, TF-IDF generation, feature selection, binary classifier generation, binary classifier application, and single cause of loss identification can be each implemented by a separate function/method/module 210a, 210b, 210c, 210d, 210e, and 210f, respectively. Such separate functions/methods/modules 210a, 210b, 210c, 210d, 210e, 210f can be invoked by an overarching function/method/module that can pass the result of a previous function/method/module to the next function/method/module, e.g., by reference to the resulting data.

Exemplary Technical Contributions

Prior to the development of the invention described herein, classification of insurance claims data was a tedious task requiring human labor. Applicant's invention not only minimizes or eliminates the need for human labor and improves accuracy, but also provides several orders of magnitude of speed improvements over human classification. For example, Applicant can classify thousands of insurance claims in seconds.

Additionally, embodiments of the invention utilizing a plurality of binary classifiers are more accurate than models utilizing a single multiple classifier as discussed in greater detail herein.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

APPENDIX

Exemplary PYTHON® source code for an implementation of an embodiment of the methods described herein is provided below.

The invention claimed is:

1. A computer-implemented method of identifying causes of loss from insurance claims data comprising a plurality of unstructured or semi-structured insurance claims, the computer-implemented method comprising:
    loading insurance claims data comprising a plurality of unstructured or semi-structured insurance claims into memory on a computer;
    for each of at least a subset of electronic insurance claims within the insurance claims data, creating a corresponding electronic pre-processed claim record from a plurality of pre-processed claim records by:
        tokenizing, via a processor, the electronic insurance claims loaded into memory to separate words in the electronic insurance claims loaded into memory from punctuation;
        lemmatizing, via the processor, the words in the electronic insurance claims loaded into memory to map morphological variations onto a common base word;
        removing, via the processor, stop words from the electronic insurance claims loaded into memory;
        removing, via the processor, punctuation and numbers from the electronic insurance claims loaded into memory; and
        replacing, via the processor, abbreviations and typographical errors with associated words previously-defined in a data dictionary stored in memory;
    mapping, for each insurance claim from the at least the subset of insurance claims, the pre-processed claim record for that insurance claim onto a vectorial representation from a plurality of vectorial representations, the vectorial representation corresponding to a unique term from the pre-processed claim record, the unique term associated with a cause of loss from a plurality of causes of losses;
    creating, via the processor and based on the plurality of vectorial representations, an electronic Term Frequency—Inverse Document Frequency (TF-IDF) matrix in memory detailing relative frequency of a plurality of n-word terms within at least a subject of a pre-processed claim record from the plurality of pre-processed claim records, wherein n is a positive integer;
    storing, via the processor, the plurality of pre-processed claim records and the plurality of vectorial representations in the memory of the computer;
    selecting, via the processor, a plurality of features from the electronic TF-IDF matrix, each feature from the plurality of features associated with a cause of loss from the plurality of causes of losses;
    creating a binary classifier selected from the group consisting of a random forest algorithm, a stochastic gradient descent algorithm, a support vector machine non-linear kernel algorithm, and a support vector machine linear kernel algorithm, for each of a plurality of causes of loss according to the selected plurality of features;

executing, via the processor and for the plurality of causes of losses, the binary classifiers against at least one of the electronic pre-processed claim records not previously used in training the binary classifiers;

identifying, via the processor, one or more causes of loss for at least one electronic pre-processed claim record from the plurality of pre-processed claim records and from the executed binary classifiers;

selecting, via the processor, a single cause of loss from the one or more causes of loss identified by the binary classifiers based upon a pre-defined hierarchy; and terminating an identification process for the identifying one or more causes of loss based on selecting the single cause of loss.

\* \* \* \* \*